United States Patent [19]

Yamakawa

[11] Patent Number: 4,731,673

[45] Date of Patent: Mar. 15, 1988

[54] IMAGE OUTPUT DEVICE

[75] Inventor: Tadashi Yamakawa, Yokohama, Japan

[73] Assignee: Canon Kabushiki Kaisha, Tokyo, Japan

[21] Appl. No.: 712,896

[22] Filed: Mar. 18, 1985

[30] Foreign Application Priority Data

Mar. 22, 1984 [JP] Japan ............................ 59-55401
Mar. 22, 1984 [JP] Japan ............................ 59-55402

[51] Int. Cl.$^4$ ........................ G01D 9/42; H04N 1/24
[52] U.S. Cl. ................................. 358/300; 358/302; 358/296; 346/153.1; 346/160
[58] Field of Search ............ 346/160, 153.1, 74; 358/302, 300, 198; 305/78, 219, 220, 221, 236, 240; 377/64, 70, 75

[56] References Cited

U.S. PATENT DOCUMENTS

| | | | |
|---|---|---|---|
| 3,711,646 | 1/1973 | Vermilion | 346/74 ES X |
| 4,335,968 | 6/1982 | Regnault | 346/76 PH X |
| 4,596,995 | 6/1986 | Yamakawa et al. | 346/160 |
| 4,689,694 | 8/1987 | Yoshida | 358/298 |

OTHER PUBLICATIONS

*The TTL Data Book for Design Engineers*, Second Edition, Texas Instruments Incorporated, 1981, pp. 7–190 to 7–205.
*The TTL Data Book for Design Engineers*, Second Edition, Texas Instruments Incorporated, 1981, pp. 7–496 to 7–498.

*Primary Examiner*—E. A. Goldberg
*Assistant Examiner*—Linda M. Peco
*Attorney, Agent, or Firm*—Fitzpatrick, Cella, Harper & Scinto

[57] ABSTRACT

An image output device has a plurality of memories each capable of reading and writing parallel data transferred in, means for instructing reading of the image data parallelly written in parallel in the memories, and a plurality of dot forming means for forming dots in accordance with the image data read from the memories.

21 Claims, 7 Drawing Figures

IMAGE OUTPUT DEVICE

BACKGROUND OF THE INVENTION

1. Field of the Invention

The present invention relates to an image output device suitable for use with a digital copier, printer, facsimile or electronic file.

2. Description of the Prior Art

Prior art printers which simultaneously print a plurality of pixels include LED printers which form latent images through an electrophotographing method by turning on and off light emitting diodes (LED's) in LED lines, and thermal printers which have lines of heat generating elements contacted to a thermal paper and form images by controlling energization of the heat generating elements.

In order to simultaneously form one line of an image at a high density, a number of dot forming elements such as LED's must be provided. For example, when an image is to be formed on size A3 record paper by pixels of 16 dots/mm, 4800 dot forming elements are required because the length of the record paper is approximately 300 mm. In order to supply control signals for controlling the formation or non-formation of the dots by the 4800 dot forming elements, 4800 signal lines should be taken out and each of the signal lines should be controlled, which is very difficult to attain.

In another approach, a memory which serially receives an image data from an external unit, temporarily stores therein at least one line of data to be recorded on a record paper and outputs the data in parallel. A driver for driving the dot forming elements in accordance with the output data is integrated and the integrated circuit is mounted near the dot forming element array. Output terminals of the integrated driver and the dot forming elements are coupled by wire bonding. A head including the dot forming elements having such a control circuit mounted thereon is usually used.

In this method, only binary recording is achieved because only a binary signal that is, ON an or OFF signal is applied to each of the dot forming elements as the control signal.

On the other hand, in a method in which a duty period of the voltage or current supplied to the dot forming elements is changed to change tonality, shift registers, each having as many bits per pixel as the number of tonalities required, a data transfer function, a timer function and a recirculation function are cascade-connected, one for each of the dot forming element lines. In this method, the image data which represents the tonality by the number of "1" bits in a predetermined number of bits are serially and sequentially supplied to the shift register, one line of the data on the record paper at a time, and then the shift register is operated in the recirculation mode to form the respective dots.

When the device which uses this method is used as an output device of a facsimile, the time required for the serial-parallel conversion in the shift register does not raise a significant problem because the density data is also serially transmitted and a long time is required to transmit one frame of data.

However, a problem occurs when an image is to be reproduced at a high speed. For example, when the image is to be formed on size A3 record paper at a pixel density of 16 pixels/mm, and the dots are formed in parallel in a lateral direction of the record paper and the record paper is subscanned longitudinally at a speed of 3 second/sheet, it is necessary to print 6720 lines in three seconds. Because 4800 dot forming elements are included in each line, 32,256,000 pixel data are to be transferred in three seconds. It corresponds to a data transmission rate of 10.75 M bps. As described above, since the image data transfer time to the shift register and the recirculation time for the dot formation are separated from each other and a switching time is required between line outputs, a transfer rate of 15 Mbps-20 Mbps is required to output the image data in three seconds.

In a prior art multi-level printer, if the number of tonalities is 17 and a bit length of the shift register is 16, a 16-bit data must be transferred for each pixel. Assuming that this multi-level printer is operated under the same condition as that described above, that is, at a print speed of 3 seconds/sheet and three seconds are required to transfer the data, the transfer rate is as high as 172 Mbps which is too high to attain.

An existing electro-photographic copier, which is widely used has a printing capability of 20 sheets/minute for size A3 paper. When a digital copier having a digital reader and a digital printer is used, a print capability of 15-20 sheets per minute is desired. Accordingly, a high speed image output device which reproduces image within three seconds per record sheet of size A3 is strongly desired.

SUMMARY OF THE INVENTION

It is an object of the present invention to provide an improved image output device.

It is another object of the present invention to provide an image output device capable of processing an image data at a high speed.

It is other object of the present invention to provide an image output device capable of reproducing a high quality of image at a high speed.

It is other object of the present invention to provide an inexpensive image output device capable of reproducing a high quality of image.

It is other object of the present invention to provide an image output device capable of processing an image data at a high speed with a simple construction.

The other objects of the present invention will be apparent from the following description of the invention made in conjunction with the accompanying drawings and the appended claims.

DETAILED DESCRIPTION OF THE PREFERRED EMBODIMENTS

Figure 1:
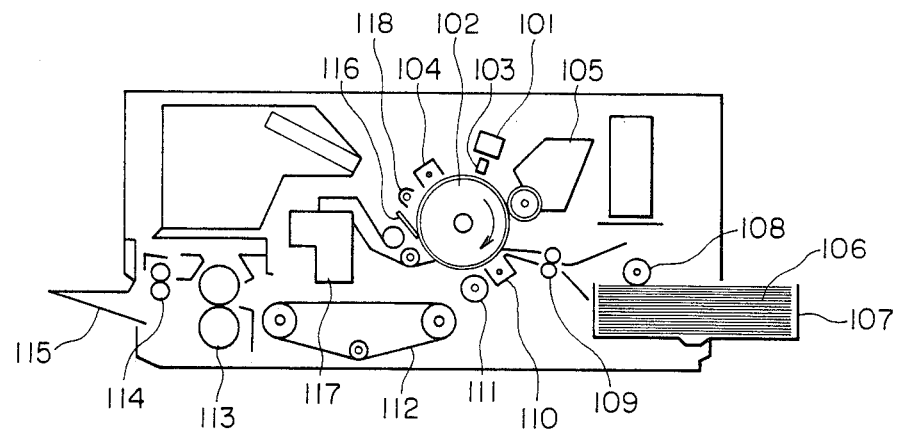
FIG. 1 shows the construction of an image recorder to which the present invention is applied.

FIG. 1 shows a construction of an image recorder in accordance with the present invention. Numeral 101 denotes an LED print head having approximately 4800 LED's which emit lights in accordance with record information supplied from an external unit (not shown), numeral 102 denotes a rotatable drum having a photoconductor on a periphery thereof, numeral 103 denotes a rod array lens which focuses the lights emitted by the LED's of the LED print head 101 onto the photoconductor surface of the drum 102, numeral 104 denotes a corona charger for precharging the photoconductor, numeral 105 denotes a developing unit for developing an electrostatic latent image by toner, numeral 106 denotes record papers, numeral 107 denotes a cassette which accommodates therein a number of record papers 106, numeral 108 denotes a feed roller for feeding the record paper 106 out of the cassette 107, numeral 109 denotes a regist roller for aligning a leading edge of the record paper to a leading edge of an image on the drum 102, numeral 110 denotes a transfer charger for transferring the developed image on the drum 102 to the record paper, numeral 111 denotes a separation roller for separating the record paper from the drum 102, numeral 112 denotes a belt for conveying the record paper, numeral 113 denotes a fixing roller, numeral 114 denotes an ejection roller for ejecting the record paper to a tray 115, numeral 116 denotes a blade cleaner for removing remaining toner on the drum 102, numeral 117 denotes a vessel for accommodating recovered toner, and numeral 118 denotes a lamp for removing remaining charge on the drum 102.

When a main switch (not shown) is turned on, a motor for driving the drum 102 is energized, the lamp 118 is turned on and the corona charger 104 is energized. Thus, the remaining charge on the drum is cleared. When a temperature of the fixing roller 113 which is heated by an internal heater reaches a fixing temperature, a record enable signal is sent to the external unit.

As the record information is supplied from the external unit, the LED's of the LED printer head 101 emit lights which are directed to the drum 102 through the rod array lens 103. When the area of the photoconductor on the drum 102 which was charged by the charger 104 reaches an exposure position, it is discharged by the lights from the LED printer head 101 so that an electrostatic latent image is formed on the drum surface. Toner is applied to the latent image by the developing unit 105 so that the latent image is visualized. The visualized image is transferred to the record paper by the transfer charger 110 in a transfer station. One of the record papers is separated from the cassette 107 by a timing operation of the paper feed roller 103 and it is fed through the transfer station by the regist roller 109 at the same speed as the circumferential speed of the drum.

The record paper on which the image was transferred is separated by the separation roller 111, fed to the fixing roller 113 by the belt 112 and ejected to the tray 115 by the roller 114.

After the transfer, the drum continues to rotate, cleaned by the blade 116 and cleared by the light from the lamp 118.

Figure 2:
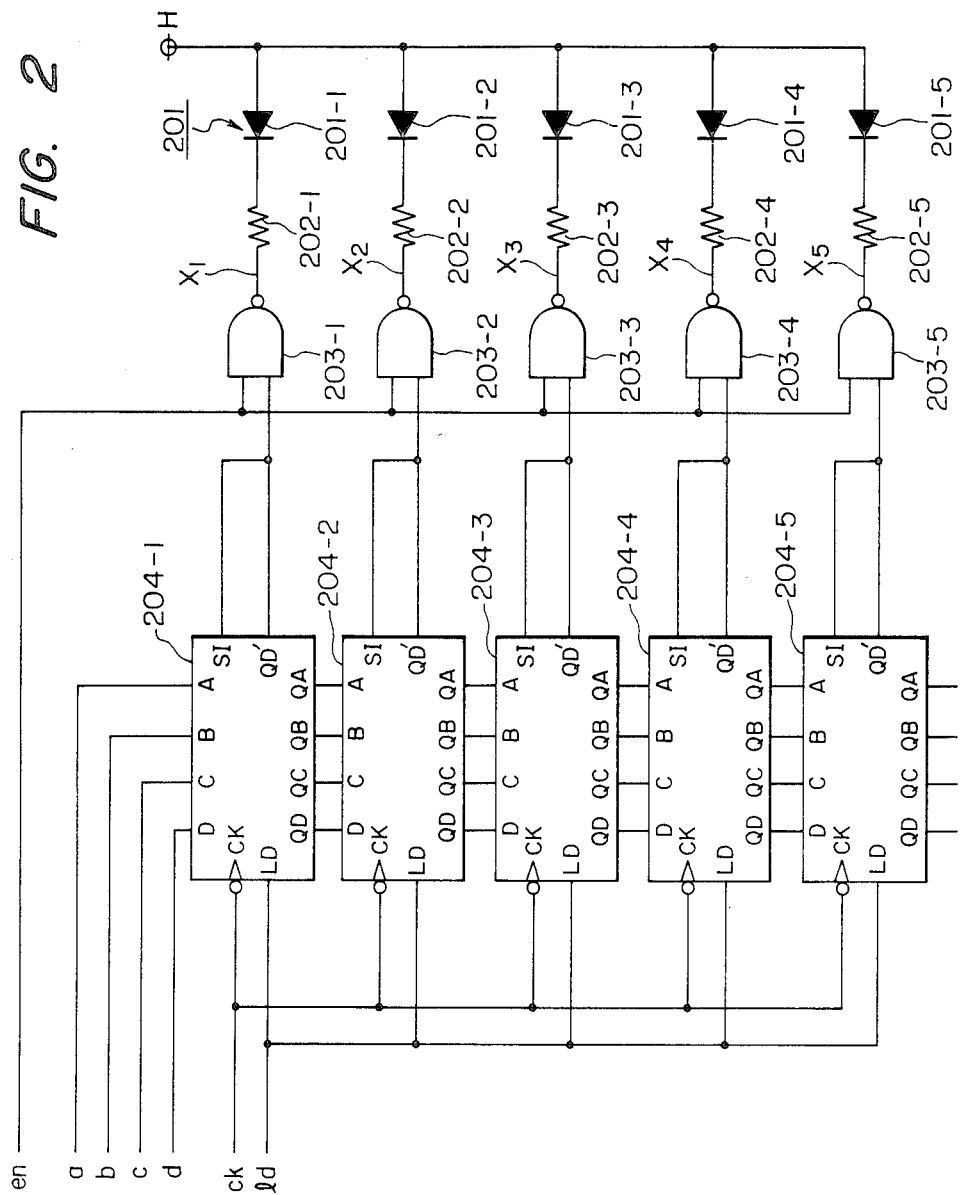
FIG. 2 shows a driver for an LED printer in the present embodiment.

FIG. 2 shows a configuration of a driver of the LED printer in the present embodiment. Numeral 201 denotes an LED array which is dot forming means turned on and off in accordance with an output data and which has LED's 201-1 through 201-5 having anodes thereof connected in common. A high level voltage is applied to the anodes. The LED array 201 requires as many LED's as the number of pixels in a main scan direction, for example, approximately 4800 LED's when a line of dots are to be formed simultaneously at a pixel density of 16 pixels/mm in a lateral direction of a size A3 record paper. In the present embodiment, for the purpose of simplicity, the LED array 201 comprises only five LED's 201-1 through 201-5.

Numerals 202-1 to 202-5 denotes current limiting resistors having first ends thereof connected to cathodes of the LED's 201-1 to 201-5, respectively, and other ends thereof connected to output terminals of LED drivers 203-1 to 203-5 which drive the LED's 201-1 to 201-5. The LED drivers 203-1 to 203-5 may be two-input NAND IC's having open collector outputs such as Texas Instruments 74S38.

Numerals 204-1 to 204-5 denote shift registers which have internal memories (not shown) capable of parallelly writing and reading image data a–d transferred in parallel in accordance with the number of tonalities required and which are capable of serially and sequentially reading the image data written into the internal memories. The shift registers 204-1 to 204-5 each may have 4-bit parallel input terminals A–D, 4-bit parallel output terminals QA–QD, a serial input terminal SI, a serial output terminal QD' and a control terminal to be described later. The shift registers may be Texas Instruments 74LS395A IC's.

First input terminals of the LED drivers 203-1 to 203-5 are connected in common and an output enable signal en which control outputs of the LED drivers 203-1 to 203-5 is supplied to the common junction. The other input terminals of the LED drivers 203-1 to 203-5 are connected to the respective serial output terminals QD' from which the data stored in the shift registers 204-1 to 204-5 are serially and sequentially outputted. The serial output terminals QD' are connected to the respective serial input terminals SI of the shift registers 204-1 to 204-5 which serially and sequentially receive the input data.

Clock pulse terminals CK of the shift registers 204-1 to 204-5 are connected in common and a clock pulse ck for synchronization is supplied to the common junction. Load terminals LD are connected in common and a load mode signal ld which is a control signal to switch input/output operations of the shift registers 204-1 to 204-5 is supplied to the common junction.

The parallel input terminals A, B, C, D of the final stage shift register 204-5 are connected to the parallel output terminals QA, QB, QC, QD of the adjacent preceding stage shift register 204-4, and the parallel input terminals A, B, C, D of the shift register 204-4 are connected to the parallel output terminals QA, QB, QC, QD of the adjacent preceding stage shift register 204-3. In this manner, the shift registers 204-2 to 204-5 have their parallel input terminals A–D connected to the parallel output terminals QA–QD of their adjacent shift registers. The parallel input terminals A–D of the first stage shift register 204-1 receive the image data a, b, c, d transferred in accordance with the number of tonalities required.

The operation of the circuit shown in FIG. 2 is now explained with reference to signal waveforms shown in FIG. 3.

Figure 3:
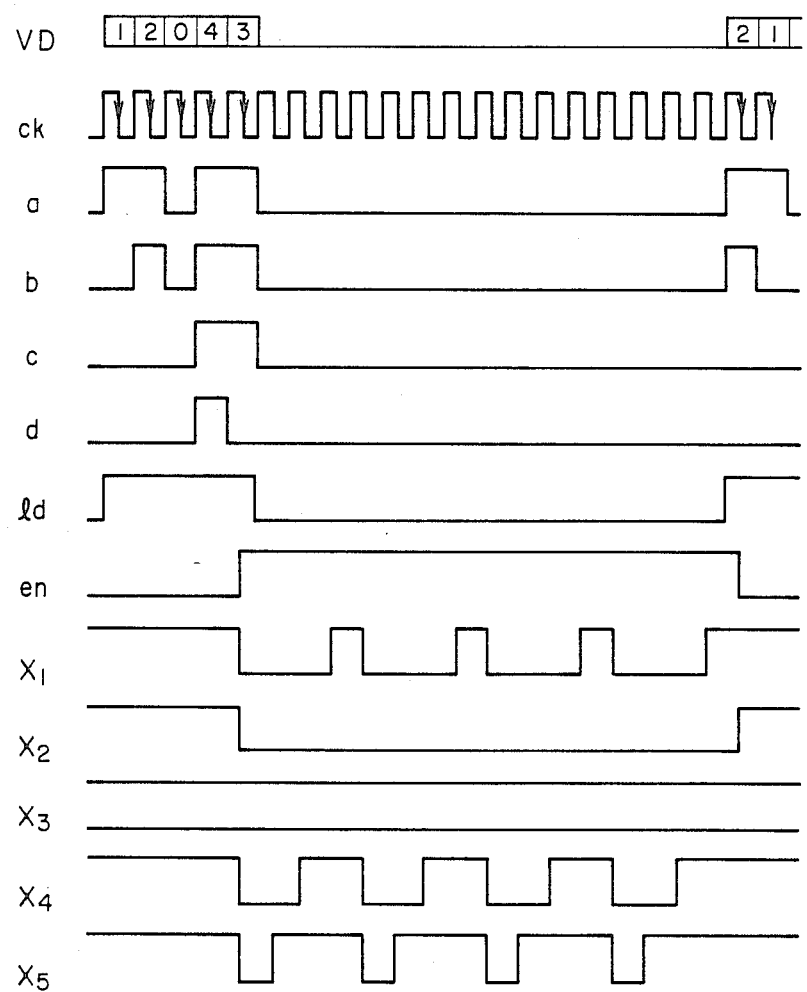
FIG. 3 shows signal waveforms for explaining an operation of the circuit of FIG. 2.

In FIG. 3, ck denotes the clock pulse which controls a timing of the transfer of the parallel image data a–d and the shift operations of the shift registers 204-1 to 204-5. When 74LS395A IC's are used as the shift registers 204-1 to 204-5, they are activated by the fall of the clock pulse ck and latch the parallel data supplied to the parallel input terminals A, B, C, D if the load mode signal ld is "1", and right-shift the stored data by one bit position at a time if the load mode signal ld is "0". A signal VD represents a density level of the pixel. The values "1, 2, 0, 4, 3" in the signal VD indicate the density data of the dots to be formed by the LED's 201-5 to 201-1, respectively.

At the first fall of the clock pulse ck, the load mode signal ld is "1" and the input image signals d, c, b, a are 0, 0, 0, 1, respectively. Accordingly, the data (0, 0, 0, 1) is supplied in parallel to the shift register 204-1 through the parallel input terminals D–A and stored in their internal memories (not shown). At the second fall of the clock pulse ck, the load mode signal ld is again "1" and the input image data (d, c, b, a) are (0, 0, 1, 1). Accordingly, the data (0, 0, 1, 1) is supplied in parallel to the shift register 204-1 through the parallel input terminals D–A and the previously stored data (0, 0, 0, 1) are outputted in parallel to the output terminals QD–QA of the shift register 204-1 and the data (0, 0, 0, 1) is inputted in parallel to the next stage shift register 204-2 through their parallel input terminals D–A.

In this manner, at the fall of the fifth clock pulse ck, the 4-bit input image data (0, 1, 1, 1), (1, 1, 1, 1), (0, 0, 0, 0), (0, 0, 1, 1) and (0, 0, 0, 1) corresponding to the values "3, 4, 0, 2, 1" of the pixel density level signals VD have been stored in the shift registers 204-1 to 204-5.

At the sixth fall of the clock pulse ck, the load mode signal ld is "0" so that the shift registers 204-1 to 204-5 start to sequentially right-shift the stored data through the serial output terminals QD's.

In the present embodiment, since the serial output terminals QD's and the serial input terminals SI's are directly connected, the 4-bit data stored in the shift registers 204-1 to 204-5 are recirculated, and one bit of each of the data is sequentially and serially outputted from the serial output terminal QD' at every fall of the clock pulse ck.

While the image data of the pixels is transferred in parallel among the shift registers 204-1 to 204-5 at the fall of the clock pulse ck when the load mode signal ld is "1", the output enable signal en which controls the LED drivers 203-1 to 203-5 is "0". Accordingly, none of the LED's 201-1 to 201-5 emits light. However, when the shift registers 204-1 to 204-5 are switched to the shift mode and serially and sequentially output the image data, the output enable signal en is "1" and the "1" data of the 4-bit image data is outputted at the fall of the clock ck and the LED's 201-1 to 201-5 emit light.

In FIG. 3, $x_1-x_5$ corresponds to the outputs of the LED drivers 203-1 to 203-5, respectively. When the data at the serial output terminal QD' of the shift register 204-1 to 204-5 is "1", the output of the corresponding LED driver 203-1 to 203-5 is "0" and the output terminal thereof is closed so that the corresponding LED 201-1 to 201-5 is turned on. On the other hand, when the data is not outputted from the serial output terminal QD' of the shift register 204-1 to 204-5, the output of the corresponding LED driver 203-1 to 203-5 is "1" and the output terminals thereof is opened so that the corresponding LED 201-1 to 201-5 is kept turned off.

Accordingly, when the image data corresponding to the density levels "3, 4, 0, 2, 1" are stored in the registers, the LED 201-1 emits a light for a period corresponding to ¾ of a maximum turn-on time, the LED 201-2 emits a light for the maximum turn-on time, the LED 201-3 does not emit a light, the LED 201-4 emits a light for a period corresponding to ½ of the maximum turn-on time, and the LED 201-5 emits a light for a period corresponding to ¼ of the maximum turn-on time. The maximum turn-on time is a time period required for the shift register 204-1 to 204-5 to serially output 16 clocks of "1" image data. In the present embodiment, the tonality to each pixel is imparted by controlling the turn-on time of the LED. In this manner, the images having the densities "3, 4, 0, 2, 1" corresponding to the input image signals are recorded on the record paper (not shown).

In the present embodiment, a higher density image is reproduced when the LED is turned on longer. Alternatively, a higher density image may be reproduced when the LED is turned off longer. If it is desirable to turn on the LED's during the parallel transfer of the image data, the LED drivers 203-1 to 203-5 may be constructed by NOR gates and the output enable signal en may be of negative logic.

Thus, when the data sent to the dot forming elements such as LED's are multi-tone data, as many shift registers as the number of dot forming elements which can parallelly input and output the data having as many bits as the number of tonalities are provided to permit the parallel transfer of the data corresponding to the number of tonalities. Accordingly, the data transfer speed is same as that for a binary printer in spite of the increase of the information quantity and the multi-tonality outputs are produced at a high speed.

In a printer which forms a line of dots simultaneously, there is a variation among the dot forming elements and hence there is a variation in the densities. In order to avoid the density variation, the density data is corrected for each dot forming element. In this case, it is necessary that the number of output tonalities is at least 16. In such a case, the present embodiment is effective.

In the present embodiment, as many image data as the number of tonalities required are parallelly transferred, the image data are serially stored in the memory means in parallel form, and when a predetermined amount of data have been stored, the stored data are serially outputted. Accordingly, the data can be processed at the same speed as that for the binary printer in spite of the increase of the image data quantity due to the increase of the number of tonalities and the multi-tonality image can be reproduced at a very high speed.

Figure 4:
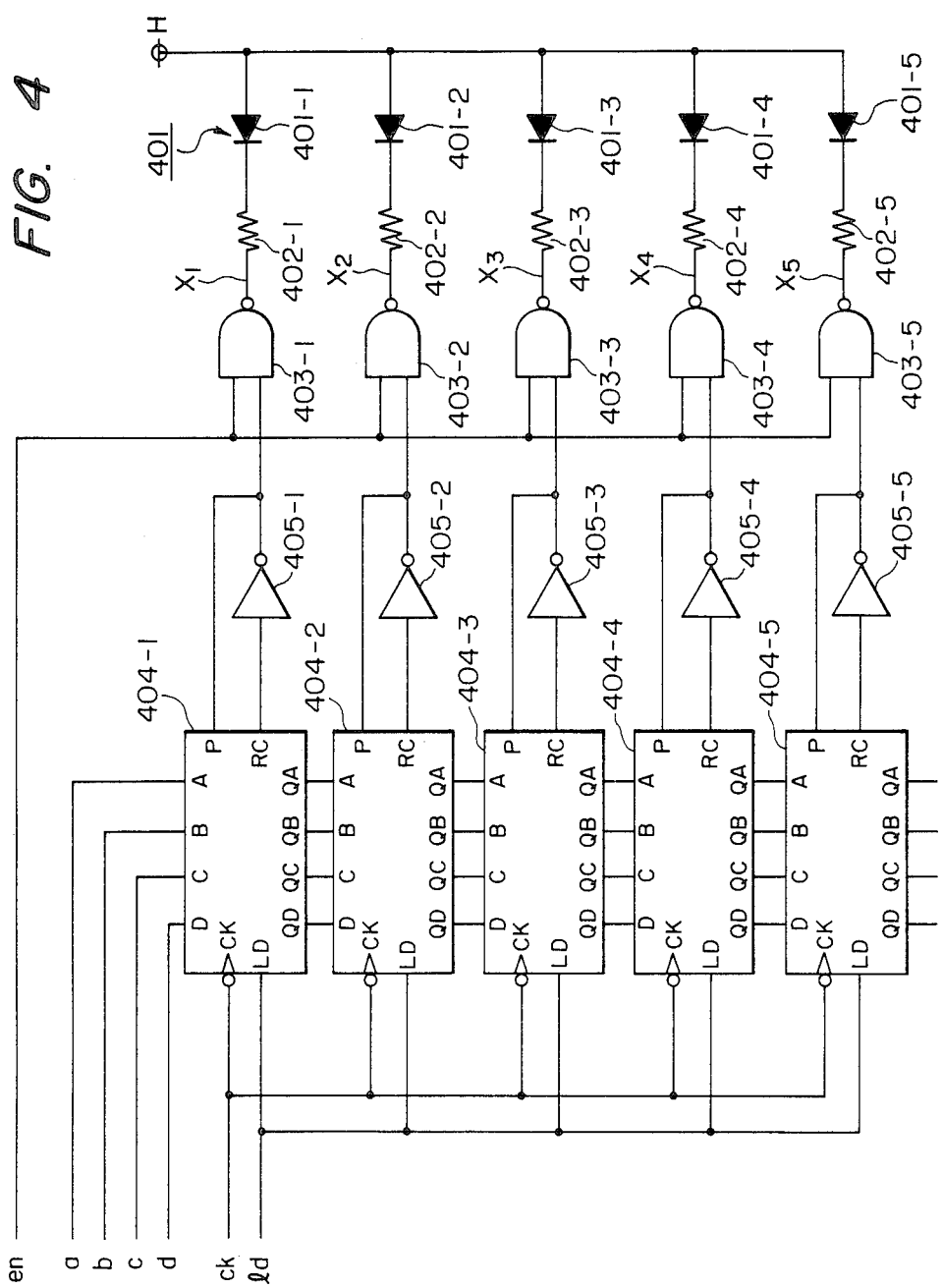
FIG. 4 shows a driver of the LED printer in another embodiment.

A second embodiment of the present invention is now explained. FIG. 4 shows a configuration of an LED printer in the second embodiment. Numeral 401 denotes an LED array which is a dot forming means turned on and off in accordance with an output data and which has LED's 401-1 to 401-5 having anodes thereof connected in common. A high level voltage is applied to the anodes. The LED array 401 requires as many LED's as the number of pixels in a main scan direction, for example, approximately 4800 LED's when a line of dots are to be formed simultaneously at a pixel density of 16 pixels/mm in a lateral direction of size A3 record paper. In the present embodiment, for the purpose of simplicity, the LED array 401 comprises only five LED's 401-1 through 401-5.

Numerals 402-1 to 402-5 denote current limiting resistors having first ends thereof connected to cathodes of the LED's 401-1 to 401-5, respectively, and other ends thereof connected to output terminals of LED drivers 403-1 to 403-5 which drive the LED's 401-1 to 401-5. The LED drivers 403-1 to 403-5 may be two-input NAND IC's having open collector outputs such as Texas Instruments 74S38.

Numerals 404-1 to 404-5 denote counters which have internal memories (not shown) capable of parallelly writing and reading image data a–d transferred in parallel in accordance with the number of tonalities required and which count starting from initial values determined by the image data written into the internal memories. The counters 404-1 to 404-5 each may have 4-bit parallel input terminals A–D, 4-bit parallel output terminals QA–QD, a ripple-carry output terminal RC which produces a carry output, a count control input terminal P which produces a count control signal and a control terminal to be described later. The counters 404-1 to 404-5 may be Texas Instruments 74LS161A IC's.

First input terminals of the LED drivers 403-1 to 403-5 are connected in common and an output enable signal en which control outputs of the LED drivers 403-1 to 403-5 is supplied to the common junction. The other input terminals of the LED drivers 403-1 to 403-5 are connected to output terminals of inverters 405-1 to 405-5 which invert inputs thereto and input terminals of the inverters 405-1 to 405-5 are connected to the respective ripple-carry out terminals RC's of the counters 404-1 to 404-5. The ripple-carry out terminals RC's are connected to the respective count control input terminals P's of the counters through the respective inverters 405-1 to 405-5.

Clock pulse terminals CK's of the counters 404-1 to 404-5 are connected in common and a clock pulse ck for synchronization is supplied to the common junction. Load terminals LD's are connected in common and a load mode signal ld which is a control signal to switch the operations the counters 404-1 to 404-5 is supplied to the common junction.

The parallel input terminals A, B, C, D of the final stage counter 404-5 are connected to the parallel output terminals QA, QB, QC, QD of the adjacent preceding stage shift register 404-4, and the parallel input terminals A, B, C, D of the shift register 404-4 are connected to the parallel output terminals QA, QB, QC, QD of the adjacent preceding stage counter 404-3. In this manner, the counters 404-2 to 404-5 have their parallel input terminals A–D connected to the parallel output terminals QA–QD of their adjacent counters. The parallel input terminals A–D of the first stage counter 404-1 receive the image data a, b, c, d transferred in accordance with the density levels of the image (the number of tonalities). In the present embodiment, unlike the first embodiment, up to 16 tonalities can be represented by the 4-bit image data.

The operation of the circuit shown in FIG. 4 is now explained with reference to signal waveforms shown in FIG. 5. In the present embodiment, unlike in FIG. 5, ck denotes the clock pulse which controls a timing of the transfer of the parallel image data a–d and the count operations of the counters 404-1 to 404-5. When 74LS161A IC's are used as the counters 404-1 to 404-5, they are activated by the rise of the clock pulse CK and latch the parallel data supplied to the parallel input terminals A, B, C, D if the load mode signal ld is "1", and count up the stored data by one if the load mode signal ld is "0". A signal VD represents a density level of the pixel. The values "1, 3, 0, 15, 7" in the signal VD indicate the density data of the dots to be formed by the LED's 401-5 to 401-1, respectively.

At the first rise of the clock pulse CK, the load mode signal ld is "1" and the input image signals d, c, b, a are 0, 0, 0, 1, respectively. Accordingly, the data (0 0, 0, 1) is supplied parallel to the counter 404-1 and stored in their internal memories (not shown). At the second rise of the clock pulse ck, the load mode signal ld is again "1" and the input image data (d, c, b, a) are (0, 0, 1, 1). Accordingly, the data (0, 0, 1, 1) is supplied in parallel to the counter 404-1 through the parallel input terminals D–A and the previously stored data (0, 0, 0, 1) is outputted in parallel to the output terminals QD–QA of the counter 404-1 and the data (0, 0, 0, 1) is inputted in parallel to the next stage counter 404-2 through their parallel input terminals D–A.

In this manner, at the rise of the fifth clock pulse ck, the 4-bit input image data (0, 1, 1, 1), (1, 1, 1, 1), (0, 0, 0, 0), (0, 0, 1, 1) and (0, 0, 0, 1) corresponding to the values "7, 15, 0, 3, 1" of the pixel density level signals VD have been stored in the counters 404-1 to 404-5.

At the sixth rise of the clock pulse ck, the load mode signal ld is "0" so that the counters 404-1 to 404-5 start to count. The counters increment the binary data at every rise of the sixth and subsequent clock pulses CK starting from the data stored at the rises of the clock pulses CK prior to the sixth clock pulse. As the counts in the counters 404-1 to 404-5 are sequentially incremented and reaches the maximum count (1, 1, 1, 1), the carry output signals are produced at the ripple-carry out terminals RC's.

In the LS161A IC, when the stored data reaches (1, 1, 1, 1), the output signal at the ripple-carry out terminal RC assumes "1" and the output signal is inverted by the inverter 405-1 to 405-5 and it is supplied to the count control terminal P of the counter 404-1 to 404-5. Accordingly, the subsequent counting of the data is inhibited until the data other than (1, 1, 1, 1) is loaded and the output signal from the ripple carry out terminal RC remains "1".

While the image data of the pixels is transferred in parallel among the counters 404-1 to 404-5 at the rise of the clock pulse ck when the load mode signal ld is "1", the output enable signal en which controls the LED drivers 403-1 to 403-5 is "0". Accordingly, none of the LED's 401-1 to 401-5 emits light. However, when the counters 404-1 to 404-5 are switched to the count mode. As a result, the output signals from the ripple-carry out terminals RC's of the counters 404-1 to 404-5 are inverted by the inverters 405-1 to 405-5 and they are supplied to the LED drivers 403-1 to 403-5. Accordingly, the LED's 401-1 to 401-5 are turned on until the counts of the counters 404-1 to 404-5 reaches the maximum count "15", respectively.

Figure 5:
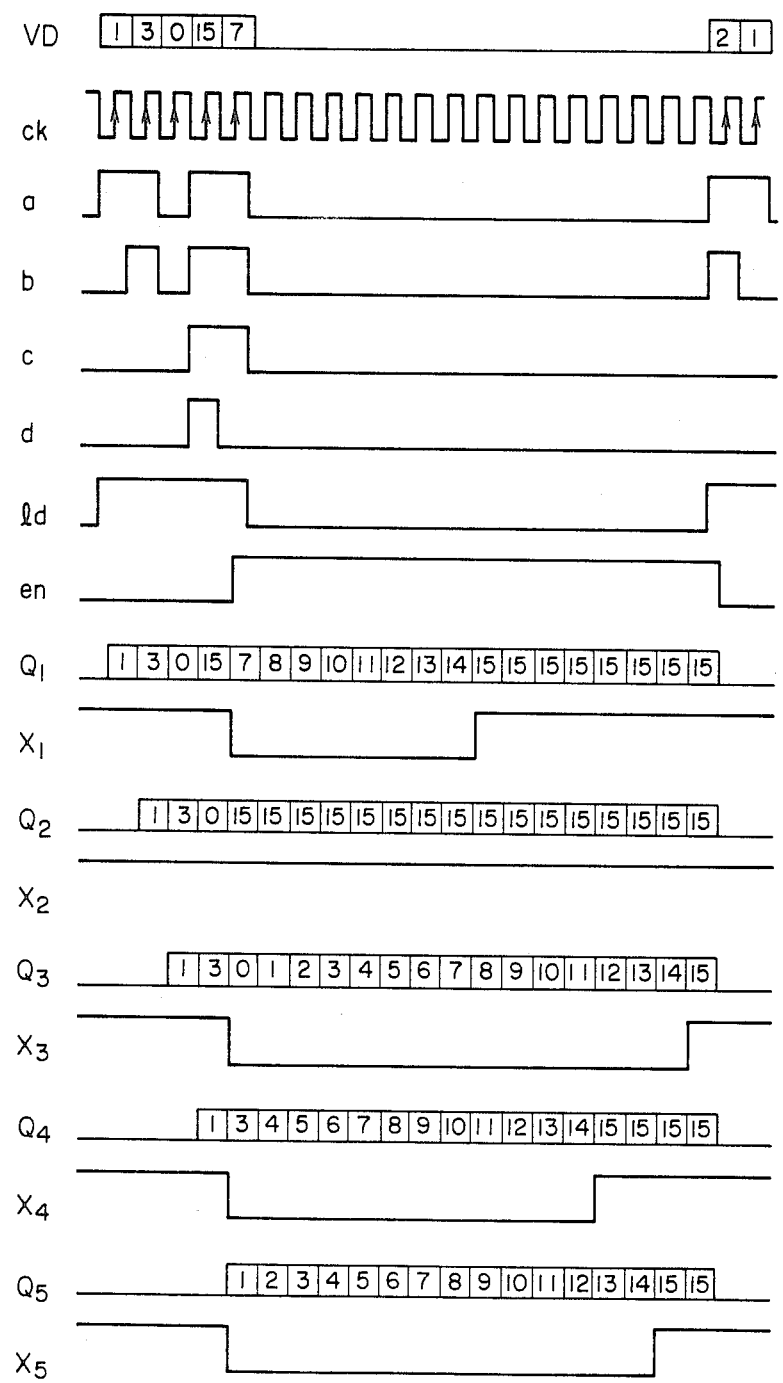
FIG. 5 shows signal waveforms for explaining an operation of the circuit of FIG. 4.

In FIG. 5, signals Q1–Q5 denote the counts of the counters 404-1 to 404-5, and $X_1$–$X_5$ denote the output signals of the LED drivers 403-1 to 403-5. When the output signals $X_1$–$X_5$ are "0" level, the output terminals are grounded and the corresponding LED's 401-1 to 401-5 are turned on, and when the output signals are "1" level, the output terminals are opened and the corresponding LED's 401-1 to 401-5 are turned off.

Accordingly, the LED 401-1 emits a light for a period corresponding to 8/15 of a maximum turn-on time, the LED 401-2 emits no light, the LED 401-3 emits a light for a full period of the maximum turn-on time, the LED 401-4 emits a light for a period corresponding to 12/15 of the maximum turn-on time, and LED 401-5 emits a light for a period corresponding to 14/15 of the maximum turn-on time. The maximum turn-on time means a period required for the counter 404-1 to 404-5 to serially output 15 clocks of "0" data. In the present embodiment, tonality is imparted to each pixel by controlling the turn-on times of the LED's. In this manner, the images having the densities "7, 15, 0, 3, 1" corresponding to the input image data can be reproduced on the record paper (not shown).

In the present embodiment, a lower density image is reproduced when the LED is turned on longer. Alternatively, a lower density image may be reproduced when the LED is turned off longer. If it is desirable to turn on the LED's during the parallel transfer of the image data, the LED drivers 403-1 to 403-5 may be constructed by NOR gates and the output enable signal en may be of negative logic.

Thus, when the data sent to the LED dot forming elements are multi-tone data, as many counters as the number of dot forming elements which can parallelly input and output the data having as many bits as the number of tonalities are provided to permit the parallel transfer of the data corresponding to the number of tonalities. Accordingly, the data transfer speed is same as that for a binary printer in spite of the increase of the information quantity and the multi-tonality outputs are produced at a high speed.

In a printer which forms a line of dots simultaneously, there is a variation among the dot forming elements and hence there is a variation in the densities. In order to avoid the density variation, the density data is corrected for each dot forming element. In this case, it is necessary that the number of output tonalities is at least 16. In such a case, the present embodiment is effective.

In the present embodiments, the counters are used as means for storing as many data as the number of output tonalities and the data are used as the initial values of the counters. Accordingly, the 4-bit, 5-bit and 6-bit input image data may be parallelly transferred for the 16 tonalities, 32 tonalities and 64 tonalities, respectively. Thus, the circuit configuration is not very complex even if the number of output tonalities increases and hence the circuit configuration is much simpler than the prior art apparatus.

In the present embodiment, the frequency of the clock pulse for parallelly transferring the image data is equal to the frequency of the clock pulse for counting up the latched image data. However, the number of image data to be transferred is very large or 4800 pixels while the number of tonalities of the output image data is 64. Thus, when the frequencies of the clock pulses are the same, the available time for the change of tonality is only 64/4800 of the parallel data transfer time, which is insufficient for the image forming time. In order to resolve this problem, the following configuration may be used.

Figure 6:
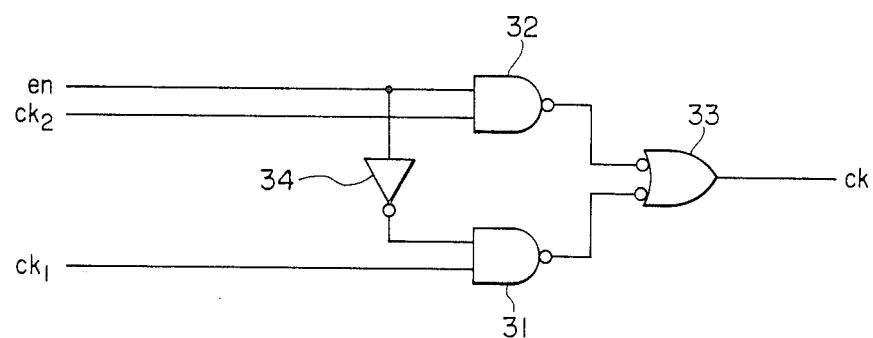
FIG. 6 shows a circuit for producing clock pulses of different frequencies.

As shown in FIG. 6, a high speed clock pulse ck1 used to transfer the parallel data and a low speed clock pulse ck2 used to count up the counters are supplied to input terminals of NAND gates 31 and 32, respectively. Those signals are selectively outputted as a clock pulse CK from an output terminal of a gate 33. The output enable signal en as the switching control signal is directly supplied to an input terminal of the NAND gate 32 and the output enable signal en is inverted by an inverter 34 and the inverted signal is supplied to an input terminal of the NAND gate 31.

Figure 7:
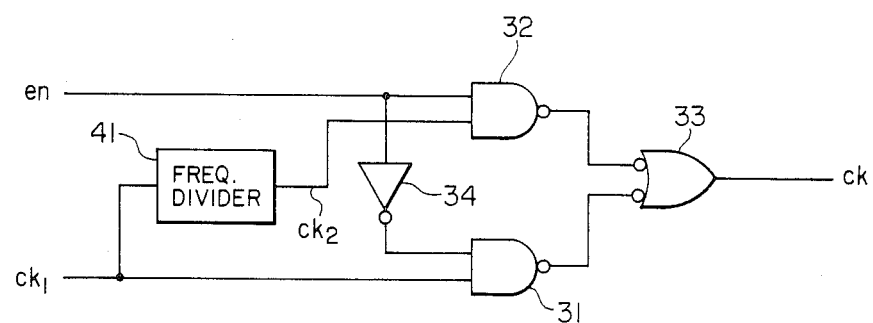
FIG. 7 shows another circuit for producing clock pulses of different frequencies.

As shown in FIG. 7, the low speed clock pulse ck2 may be produced by dividing the high speed clock pulse CK1 by a frequency divider 41. Accordingly, only the high speed clock ck1 need be supplied. When the parallel data transfer time is equal to the count-up time of the counters, the high speed clock pulse ck1 may be divided by the frequency divider 41 by a factor of 75 and the divided clock pulse may be used as the low speed clock pulse ck2. FIGS. 6 and 7 may also be applied to the circuit of FIG. 2.

In the present embodiment, the count-up counters are used. Alternatively, count-down counters may be used.

As described above, as much image data as the number of tonalities required is parallelly transferred, the image data is stored in the memory means in parallel form and the image data stored in the memory means is used as the initial values for counting. Accordingly, the data can be processed at the same speed as that for a binary printer in spite of the increase of the input image data due to the increase of the number of tonalities and a high speed image reproduction is attained.

In the above embodiments, LED's are used as the dot forming elements. Alternatively, heat generating elements may be used as the dot forming elements.

The shift registers and the counters shown in FIGS. 2 and 4 need not be connected in one line but one line may be divided into blocks and the shift registers or the counters may be connected for each block and the parallel image data may be simultaneously transferred to the blocks. Thus, the image data transfer time can be further shortened.

In FIGS. 2 and 4, the parallel image data a–d may be transferred from a host computer through a bus line.

The present invention is not limited to the illustrated embodiments but various modifications may be made within a scope of the appended claims.

What is claimed is:

1. An image output device comprising:
   a plurality of memory means each capable of writing or reading image data transferred in parallel, wherein each of said memory means has parallel data input terminals, parallel data output terminals, a serial data output terminal and a control signal input terminal, said parallel data output terminals are capable of connecting to parallel data input terminals of another memory means, and said memory means has a load mode for writing image data input through said parallel data input terminals and shift mode for outputting written image data from said serial output terminal, said load mode or shift mode being selected in accordance with a control signal for controlling data read, said control signal being input through said control signal input terminal;
   clock means for providing a clock signal, said clock signal being used for parallel transfer of image data between said plurality of memory means in said load mode and for serial output of image data in said plurality of memory means in said shift mode, wherein said clock signal has a first frequency in said load mode and a second frequency lower than the first frequency in said shift mode; and
   a plurality of dot forming means for forming dots in accordance with image data serially read from said plurality of memory means.

2. An image output device according to claim 1 wherein said plurality of memory means are provided one for each of said plurality of dot forming means.

3. An image output device according to claim 1 wherein said plurality of memory means are shift registers.

4. An image output device according to claim 1 wherein said plurality of dot forming means include an LED array.

5. An image output device according to claim 1 wherein said image data transferred in parallel have as many bits as a predetermined number of tonalities.

6. An image output device according to claim 1 wherein said plurality of memory means have a serial data input terminal for receiving data from a serial data output terminal.

7. An image device comprising:
a plurality of count means having memory means capable of writing or reading image data transferred in parallel, each said count means having parallel data input terminals, parallel data output terminals and a control signal input terminal, said parallel data output terminals being capable of connecting to parallel data input terminals of another count means and said count means having a load mode for writing image data input through said parallel data input terminals and a count mode for counting written image data up or down, wherein said load mode or said count mode is selected in accordance with a control signal for controlling data read, said control signal being input through said control signal input terminal;
clock means for providing a clock signal, said clock signal being used for parallel transfer of image data between said plurality of count means in said load mode and for counting image data in said plurality of count means up or down in said count mode, wherein said clock signal has a first frequency in said load mode and a second frequency lower than the first frequency in said count mode; and
a plurality of dot forming means for forming dots in accordance with count outputs from said plurality of count means.

8. An image output device according to claim 7 wherein each of said plurality of count means counts image data beginning with a preset value of said written image data.

9. An image output device according to claim 7 wherein said plurality of count means are provided one for each of said plurality of dot forming means.

10. An image forming device according to claim 7 wherein said plurality of dot forming means includes an LED array.

11. An image output device according to claim 7 wherein said image data transferred in parallel have as many bits as a predetermined number of tonalities.

12. An image output device comprising:
count means capable of writing image data transferred, said count means counting data based on said written image data up or down and having a carry signal output terminal for outputting a carry signal; and
a plurality of dot forming means for forming dots in accordance with said carry signal output from said count means, said dot forming means forming dots until said carry signal is output.

13. An image output device according to claim 12 wherein said count means counts image data beginning with a preset value of said written image data.

14. An image output device according to claim 12 wherein said count means is provided one for each of said plurality of dot forming means.

15. An image output device according to claim 12 wherein said plurality of dot forming means includes an LED array.

16. An image output device according to claim 12 wherein said image data transferred in parallel has as many bits as predetermined number of tonalities.

17. An image output device according to claim 12 wherein said image data is written in said count means in parallel.

18. An image output device comprising:
a plurality of memory means each capable of writing or reading image data transferred in parallel;
select means for selecting a load mode for transferring image data in order between said plurality of memory means or a shift mode for serially reading image data from said memory means;
clock means for providing a first clock signal of a first frequency used for parallel transfer of image data in said load mode and a second clock signal of a second frequency used for serial output of image data in said shift mode, said first frequency being higher than said second frequency;
a plurality of dot forming means for forming dots in accordance with image data serially read from said plurality of memory memory means; and
gating means adapted for inhibiting operation of said plurality of dot forming means.

19. An image outputting device according to claim 18, wherein each said memory means has parallel data input terminals, parallel data output terminals, a serial data output terminal and a control signal input terminal and said parallel data output terminals are capable of connecting to parallel data input terminals of another memory means, said load mode or said shift mode being selected in accordance with a control signal for controlling data read, said control signal being input through said control signal input terminal and said gating means inhibiting the operation of said plurality of dot forming means when said load mode is selected.

20. An image output device according to claim 7, wherein said each count means has a carry signal output. terminal for outputting a carry signal and said each dot forming means forms dots until said carry signal is output.

21. An image output device according to claim 20, wherein said count means is adapted to output said carry signal until said count mode is reset.

* * * * *

UNITED STATES PATENT AND TRADEMARK OFFICE
CERTIFICATE OF CORRECTION

PATENT NO. : 4,731,673  
DATED : March 15, 1988  
INVENTOR(S) : TADASHI YAMAKAWA Page 1 of 3

It is certified that error appears in the above-identified patent and that said Letters Patent is hereby corrected as shown below:

AT [57] IN THE ABSTRACT

Line 3, "in," should read --in parallel,--.  
    Line 4, "parallelly" should be deleted.

COLUMN 1

Line 41, "signal that is, ON an" should read --signal, that is, an ON--

COLUMN 2

Line 28, "image" should read --images--.  
    Line 37, "other" should read --another--.  
    Line 41, "other" should read --another--.  
    Line 44, "other" should read --another--.

COLUMN 3

Line 21, "regist" should read --register--.  
    Line 57, "regist" should read --register--.

COLUMN 4

Line 12, "denotes" should read --denote--.

COLUMN 5

Line 67, "terminals" should read --terminal--.

UNITED STATES PATENT AND TRADEMARK OFFICE
CERTIFICATE OF CORRECTION

PATENT NO. : 4,731,673

DATED : March 15, 1988

INVENTOR(S) : TADASHI YAMAKAWA

It is certified that error appears in the above-identified patent and that said Letters Patent is hereby corrected as shown below:

COLUMN 6

Line 11, "register" should read --registers--.

COLUMN 7

Line 40, "operations the" should read --operations of the--.

COLUMN 8

Line 8, "parallel" should read --in parallel--.
    Line 37, "inverter" should read --inverters--.
    Line 38, "counter" should read --counters--.
    Line 49, "mode." should read --mode,--.
    Line 50, "As a result," should be deleted.

COLUMN 9

Line 5, "counter" should read --counters--.

COLUMN 10

Line 5, "CK1" should read --ck1--.

COLUMN 11

Line 17, "image device" should read --image output device--.
    Line 51, "forming" should read "output--.

UNITED STATES PATENT AND TRADEMARK OFFICE
CERTIFICATE OF CORRECTION

PATENT NO. : 4,731,673

DATED : March 15, 1988

INVENTOR(S) : TADASHI YAMAKAWA

It is certified that error appears in the above-identified patent and that said Letters Patent is hereby corrected as shown below:

COLUMN 12

Lines 16-18 should be deleted.
    Line 19, "17" should read --16--.
    After line 21, insert the following:
        -- 17. An image output device according to claim 16 wherein said image data transferred in parallel has as many bits as a predetermined number of tonalities.--.
    Line 37, "memory memory" should read --memory--.
    Line 40, "outputting" should read --output--.
    Line 52, "," should be deleted.
    Line 54, "put." should read --put--.
    Line 57, "," should be deleted.

Signed and Sealed this

Third Day of January, 1989

Attest:

DONALD J. QUIGG

*Attesting Officer*       *Commissioner of Patents and Trademarks*